D. A. FISHER.
Miter-Machine.

No. 160,090.

Patented Feb. 23, 1875.

WITNESSES:
C. Neveux
C. Sedgwick

INVENTOR:
D. A. Fisher
BY
[signature]
ATTORNEYS.

THE GRAPHIC CO.PHOTO-LITH.39 & 41 PARK PLACE,N.Y.

UNITED STATES PATENT OFFICE.

DANIEL A. FISHER, OF ALLEGHENY, PENNSYLVANIA, ASSIGNOR TO HIMSELF AND O. CHAMBERS, OF SAME PLACE.

IMPROVEMENT IN MITER-MACHINES.

Specification forming part of Letters Patent No. 160,090, dated February 23, 1875; application filed June 20, 1874.

*To all whom it may concern:*

Be it known that I, DANIEL A. FISHER, of Allegheny, in the county of Allegheny and State of Pennsylvania, have invented a new Improvement in Miter-Machines, of which the following is a specification:

My invention consists of a circular saw with mechanism for dropping it below the table, shifting it from one bevel to the other, and lifting it up through the table in regular succession for utilizing it to saw right and left bevels for miters without shifting the stick to be sawed.

Figure 1:
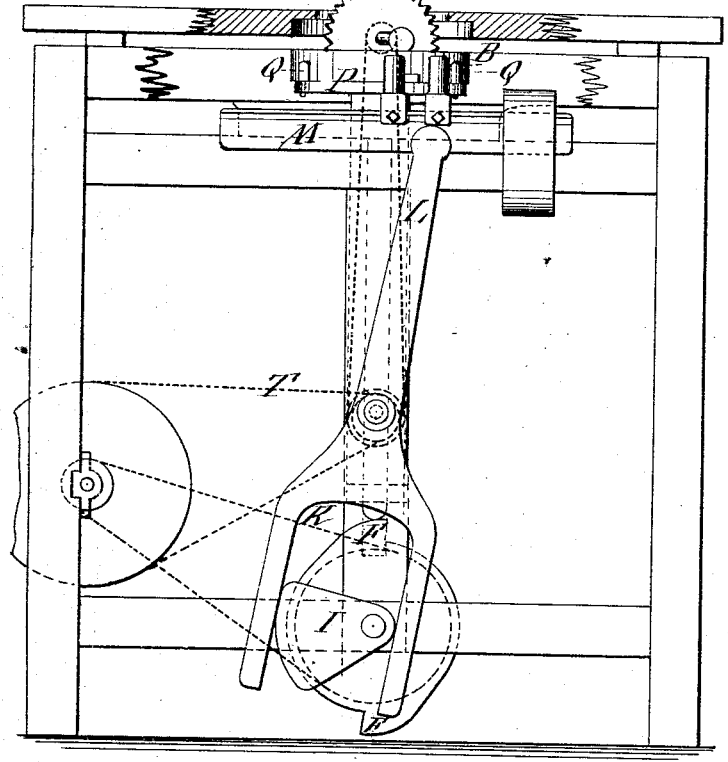
Figure 2:
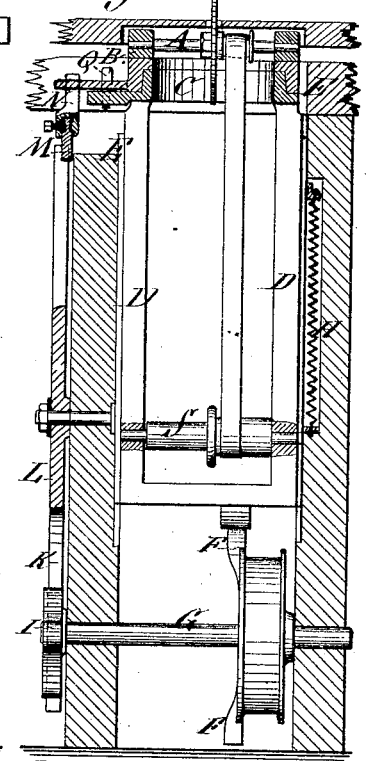
Figure 3:
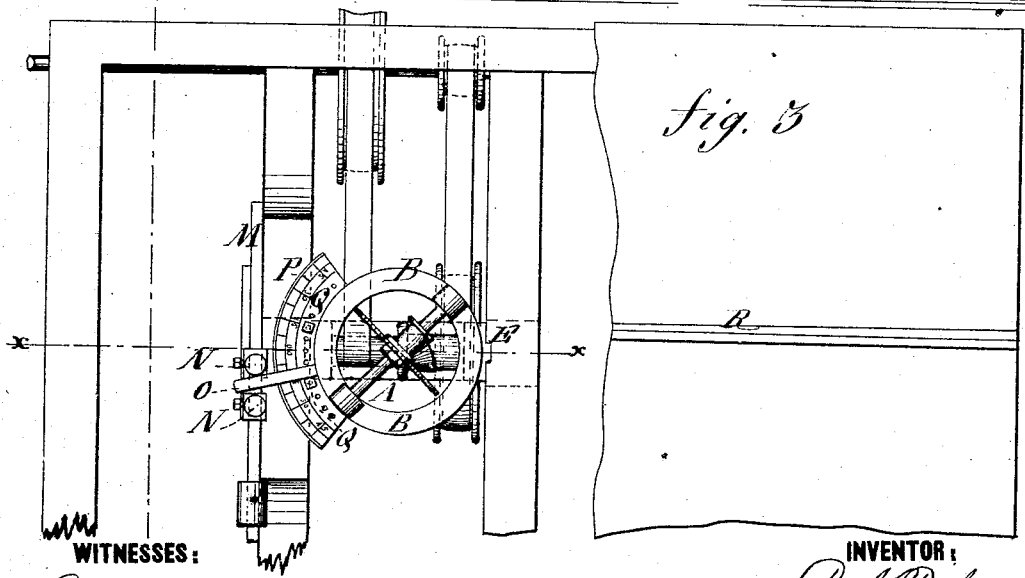

Figure 1 is partly a side elevation and partly a sectional elevation of a miter-sawing machine, contrived according to my invention. Fig. 2 is a sectional elevation, taken on the line $x$ $x$ of Fig. 3. Fig. 3 is a plan view with a portion of the table-top removed.

Similar letters of reference indicate corresponding parts.

The saw-arbor A is mounted on a horizontal circular ring, B, which is fitted on a similar support, C, so as to revolve forty five degrees or more, and the support C is mounted on a frame, D, fitted to slide up and down in the vertical ways E of the frame, and having cams F below to raise it twice to each revolution of the cam-shaft G. In this example a spring, H, is shown in connection with the frame, to pull it down; but it may be used or not, as may be preferred. On the cam-shaft G is a cam, I, working in a yoke of a vibratting lever, L, which, at its upper end, moves a slide, M, carrying studs N, which turn the ring B on which the saw is mounted first one way and then the other, to shift it for cutting right or left bevels. The cam I is arranged relatively to the cams F, to move the lever and shift the saw while it is below the table, and to work it alternately with each movement of the saw. The studs N are adjustable along the bar M toward and from each other, to work the saw more or less to adjust it for different angles; they are set close to the arm O for the greatest movement, and adjusted apart as the angle to be sawed is lessened.

A protractor, P, and setting-pins Q, are employed to adjust the studs for the required bevels, as follows: The protractor being used to set the pins Q to the angle wanted, and the pins being used to hold the arm O as a gage by which to set the studs N, so that the bar M, whose movements are always the same, will move the arm to the pins Q and no farther. The strips to be sawed are placed by the side of the work-gage R, and held until the saw has been twice moved up through the table and let down again, when both bevels of a miter will be sawed. Two strips may be sawed at once by having one on each side of the work-guide R. The counter-shaft S, for transmitting the motion to the saw, is mounted on the frame D to rise and fall with it, and receives the driving-belt T from a horizontal line, or thereabout. Thus it will be seen that the two angles of a miter may be cut without shifting the work from one gage to another. The studs N allow the arm O to rise and fall with the saw, and at the same time maintain the requisite connection for moving the arm properly.

Having thus described my invention, I claim as new and desire to secure by Letters Patent—

1. The combination, with a sawing-bench or table, of a circular saw, having a vertical movement up through the table and below it alternately, with an oscillatory movement in a plane parallel with the table, substantially as specified.

2. The cam I, rock-lever L, sliding bar M, studs N, and arm O, combined with the oscillatory ring B and ring-support C, to oscillate s a w, in the manner described.

3. The combination of the protractor P, and adjusting-pins Q, with the arm O of the oscillating ring-support B, and the adjustable studs N of the sliding bars M, substantially as specified.

DANIEL A. FISHER.

Witnesses:
JOHN S. JEFFREY,
THOMAS A. LAUFLY.